United States Patent

[11] 3,539,139

| [72] | Inventor | Robert A. Eucker |
| | | Brooklyn, Ohio |
| [21] | Appl. No. | 735,873 |
| [22] | Filed | June 10, 1968 |
| [45] | Patented | Nov. 10, 1970 |
| [73] | Assignee | Preformed Line Products Company |
| | | Cleveland, Ohio |
| | | a corporation of Ohio |

[54] APPLIANCE FOR LINEAR BODIES
3 Claims, 5 Drawing Figs.

[52] U.S. Cl.................................................. 248/63, 174/40
[51] Int. Cl................................................... F16l 3/10
[50] Field of Search........................................ 248/63, 74, 62, 61, 53; 174/40, 42

[56] References Cited
UNITED STATES PATENTS

| 2,731,509 | 1/1956 | Becker | 174/42 |
| 2,872,141 | 2/1959 | Hefner | 248/62 |
| 2,976,344 | 3/1961 | Bethel | 248/61X |
| 3,006,674 | 10/1961 | Becker | 248/62X |
| 3,219,298 | 11/1965 | Ruhlman | 248/63 |

*Primary Examiner*—Chancellor E. Harris
*Attorney*—Hume, Clement, Hume and Lee, Ltd ABSTRACT: The disclosed cable support assembly substantially reduces cable vibrations and other dynamic cable motion thereby enhancing the reliability and effective life of both the cable and support assembly. A clamping apparatus embraces the cable and is provided with a pair of opposed clamping arms having aligned bolt-receiving apertures therein while a suspension arm positioned intermediate the opposed clamping arms has a bolt-receiving aperture aligned with those of the clamping means. A pair of washers of a viscoelastic material are interposed in bolted relation intermediate the suspension arm and respective ones of the clamping arms. Other features are disclosed.

Patented Nov. 10, 1970 3,539,139
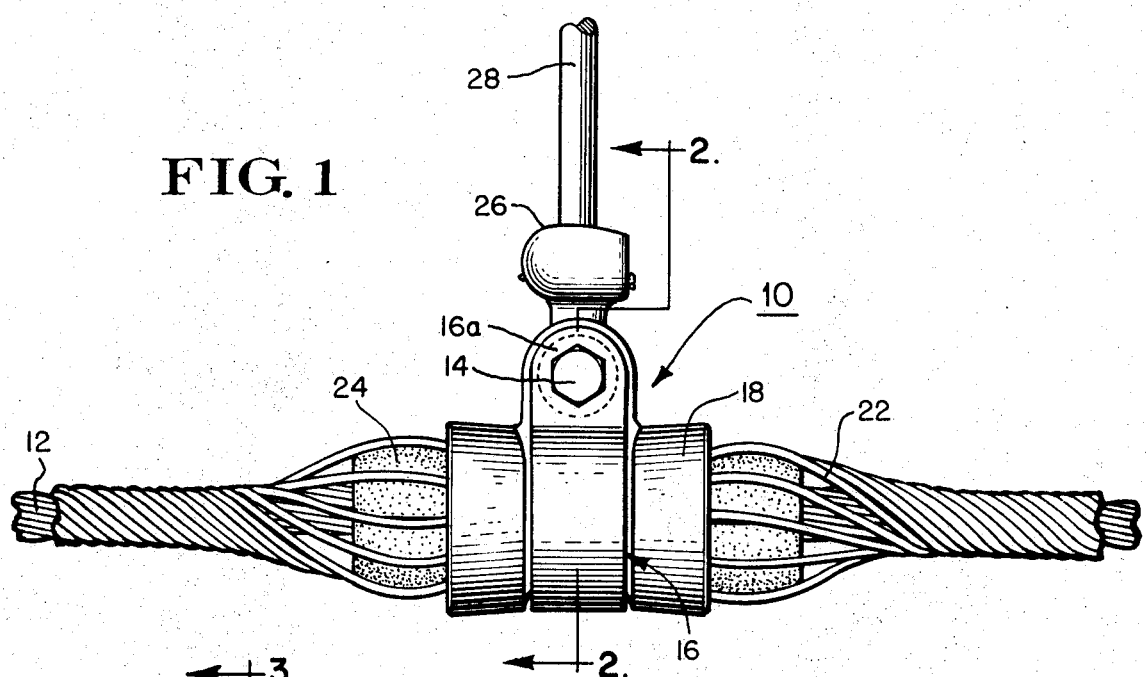
FIG. 1
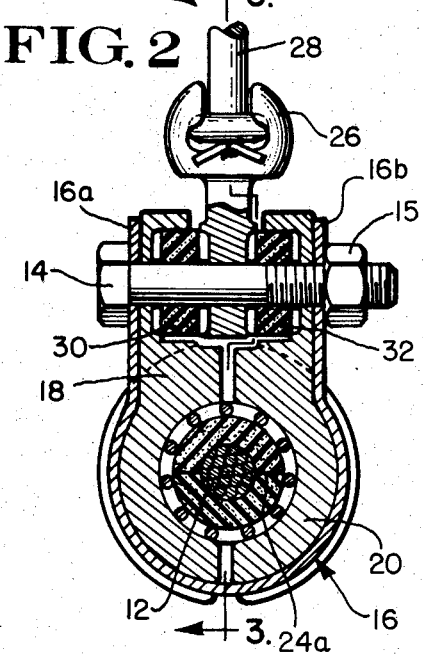
FIG. 2
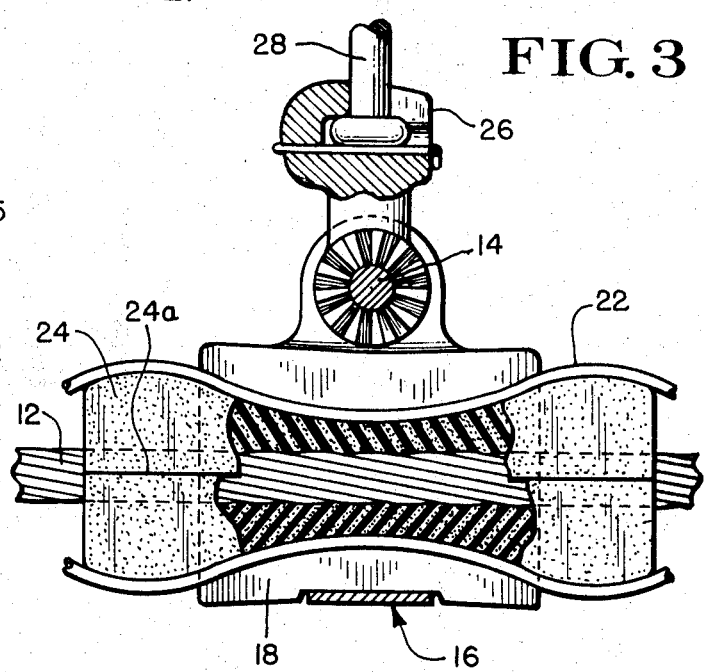
FIG. 3
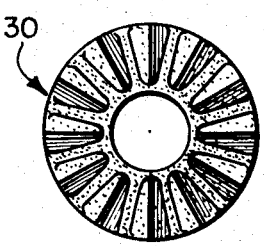
FIG. 4  FIG. 5
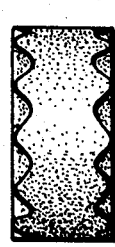
Inventor
Robert A. Eucker
By Hume, Clement, Hume & Lee
Attorneys 3,539,139

APPLIANCE FOR LINEAR BODIES

SPECIFICATION

Introduction

The present invention relates generally to the reenforcement and suspension of linear bodies, such as electrical transmission lines or cables and, more specifically, to a new and improved cable support assembly for reducing or substantially eliminating undesired bending stresses and translation vibration between a cable-clamping apparatus and a suspension means and for providing a resilient damping of cable motion components.

SUMMARY OF THE INVENTION

It is a primary object of the present invention to provide a new and improved cable support assembly.

It is another object of the present invention to provide a cable support assembly which effectively damps cable vibrations or other dynamic cable motions such as caused by wind or other climatic conditions thereby both prolonging the effective life of the cable support assembly and improving the reliability of its performance.

It is a more specific object of the present invention to provide a cable support assembly in which a pair of viscoelastic washers are interposed between a suspension means and the cable-gripping assembly to act as an energy-absorbing means.

Accordingly, the present invention is directed to a support assembly for an electrical transmission cable or the like comprising a cable-clamping means adapted for embracing the cable and having a pair of opposed clamping arms with aligned bolt receiving apertures therein. A suspension arm means is adapted to be positioned intermediate the opposed clamping arms with its bolt-receiving aperture adapted for alignment with the receiving apertures of the clamping arms. A pair of washers of a resilient material are adapted to be interposed in bolted relation intermediate the suspension arm means and respective ones of the clamping arms for damping cable vibrations and pivotal movement between the suspension arm means and the clamping means.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGS. of which like reference numerals identify like elements and in which:

FIG. 1 is a side elevation of a support clamp assembly constructed in accordance with the teachings of the present invention;

FIG. 2 is a cross-sectional view taken along lines 2-2 of FIG. 1;

FIG. 3 is a longitudinal section of the support clamp assembly taken along lines 3-3 of FIG. 2;

FIG. 4 is a plan view of one of the pair of resilient washers which forms a part of the support assembly of the present invention; and FIG. 5 is an end view of the washer of FIG. 4.

DESCRIPTION OF THE PREFERRED EMBODIMENT

Referring now to FIGS. 1 and 2, the cable support assembly 10 there illustrated is adapted for suspending an electrical transmission cable 12 or the like from a ceramic insulator or other hardware fitting (not shown) of a line pole. As will presently be explained in detail, the support assembly comprises a lower, clamping portion which embraces the cable 12 and an upper, suspension arm portion that is pivotally connected to the clamping means by conventional fastening means, such as the bolt and nut 14 and 15, respectively.

More particularly and as again shown in FIGS. 1 and 2, the clamping means includes a generally U-shaped strap member 16 having a pair of opposed clamping arm portions 16a and 16b with aligned bolt-receiving apertures therein. The clamping means further includes a pair of mated cable-gripping elements or shoes 18 and 20 that are received in opposed facing relation between the arm portions 16a and 16b of the clamping strap 16. The gripping elements 18 and 20 are provided with appropriate recesses on their outer surface to positively locate or index the gripping elements relative to the strap 16 while their interior surfaces are appropriately contoured to conform to the protectively covered cable 12. The gripping elements 18 and 20 also extend a substantial longitudinal distance on either side of the encompassing strap 16 to provide a full support for the cable.

Preferably, the support assembly 10 does not directly grasp or contact the cable 12 but rather effects the gripping thereof through a mechanically protective covering for the cable. Specifically and as shown in FIGS. 1-3 of the drawing, this protective covering includes a series of preformed helical armor rods 22 which are interwound about the cable 12 and, in the region of the support assembly 10, also overlie a protective cushion 24 for the cable. The cushion 24 is of a rubberlike composition such as neoprene and is annular in cross section with a centrally disposed bore for passing the cable 12, as most clearly is seen in FIGS. 2 and 3. The cushion 20 is severed along a horizontal plane through the lines 24a to provide two half sections which are taped together or the like after application to the cable to temporarily hold the half sections in place until the helical members 22 are applied thereabout.

To prevent longitudinal shifting of the cable support assembly 10 relative to the cable, the cushion 20 of the present embodiment is of a saddle-shaped contour along its longitudinal profile, that is, the cushion is narrower in cross section at its center than at its opposite ends. For like reasons, the interior surfaces of the gripping elements 18 and 20 are of a contour to conform to that of the cushion.

The helical rods 22 preferably are carefully applied to the cushion 24 so as to only extend axially along the length of the cushion, i.e., not to encircle the cushion, and to conform to the saddle-shaped contour thereof. Beyond the end of the cushion 24, the members 22 are permitted to assume their normal helical pitch and encompass the cable 12 in conventional fashion. The preformed helical members 22 are familiar to the art and their construction need not be considered in detail herein. Further types of cushion and preformed rod arrangements are disclosed and claimed in Peterson U.S. Pat. No. 2,722,393 assigned to the same assignee as the present invention.

The support assembly 10 also includes a suspension arm means in the form of a socket member 26, the lower extension of which includes a central bore or aperture adapted for receiving the bolt 14. The upper portion of the socket member 26 is formed so as to interlock with the enlarged annular base of an upwardly extending hanger arm 28 that connects to the hardware fitting or ceramic insulator (not shown) of the line pole or tower. A cotter pin secures members 26 and 28 in assembled relation.

In order to reduce or substantially damp undesired vibration or other dynamic motion components of the cable 12 such as caused from high winds or other climatic conditions, etc., a pair of washers of a resilient material are interposed in bolted relation intermediate the suspension arm socket member 26 and respective ones of the clamping arms 16a and 16b of the U-shaped strap 16. More particularly in the present embodiment, the washers 30 and 32 are confined between the opposed surfaces of the gripping elements 18 and 20 and the socket member 26, respectively.

The washers 30 and 32 are composed of a viscoelastic material such as a suitable form of neoprene or silicon rubber, and are of sufficient thickness for resiliently and substantially damping vibratory movements of the cable. In this regard, it has been found preferable that the washers, the cable-clamp ing means and the suspension arm means be constructed and arranged for substantially precluding relative rotational movement between the contiguous surfaces of the cable-clamping means 18, 20, the suspension arm means 26 and the pair of washers 30 and 32. In this way, the full extent of the relative rotational movement between the clamping elements 18, 20 and the suspension arm 26 effects a corresponding torsional stress within the washers 30 and 32 thereby maximizing the damping influence of these washers.

Further to the above end, the opposed surfaces of the washers are serrated or otherwise roughened, as exemplified by the construction of the washer 30 illustrated in FIGS. 4 and 5. As shown in FIG. 4, the sidewalls of each serrated depression lie along a pair of radii of the washer. The serration also increases gradually in depth as well as in width in proceeding from the internal hub to the outer periphery of the washer. The serrated faces of washers 30 and 32 mutually engage or mate with complementary serrations on the interior surfaces of gripping elements 18 and 20 as well as similar serrations on the opposed surfaces of the socket member 26.

Although a serrated washer of the described construction has been found satisfactory in preventing significant relative rotation of the washers 30, 32 and the contiguous members, it will also be recognized by those skilled in the art that the surfaces of the washers may be bonded to the gripping elements and suspension arm or otherwise mechanically fastened thereto to effect the desired result. As a further alternative, the opposed surfaces of the washers may be coated with an abrasive grit to substantially increase the coefficient of friction with the contiguous clamping and suspension elements.

It will also be recognized by those skilled in the art that the teachings of the present invention are useful in conjunction with cable-clamping and suspension means other than the specific embodiment herein illustrated. For example, the present invention is useful in conjunction with the cable support constructions illustrated in the aforesaid Peterson U.S. Pat. No. 2,722,393 and in a copending Johnson U.S. Pat. application Ser. No. 693,009 filed Dec. 22, 1967 which is assigned to the same assignee as the present invention.

While particular embodiments of the present invention have been shown and described, it is apparent that various changes and modifications may be made, and it is therefore intended in the following claims to cover all such modifications and changes as may fall within the true spirit and scope of this invention.

I claim:

1. A support assembly for an electrical transmission cable or the like, comprising:
    cable-clamping means for embracing said cable and having a pair of opposed clamping arms with aligned bolt-receiving apertures therein;
    suspension arm means positioned intermediate said opposed clamping arms and having a bolt-receiving aperture for alignment with said receiving apertures of said clamping arms;
    a pair of washers of a resilient viscoelastic material interposed in bolted relation intermediate said suspension arm and respective ones of said clamping arms, said washers each being of a sufficient thickness for resiliently and substantially damping cable vibrations and pivotal movement between said suspension arm and said clamping means; and
    securing means for substantially precluding relative rotation between said washers and both said cable-clamping means and said suspension arm means for transferring rotational movement into torsional stress of said viscoelastic washers.

2. The support assembly of claim 1 in which the opposed surfaces of each of said pair of washers is serrated for effecting a secure frictional gripping with said cable-clamping means and said suspension arm means.

3. The support assembly of claim 2 in which said cable-clamping means comprises a generally U-shaped clamping element having opposed leg portions and a return bent intermediate portion and a pair of cable-gripping elements adapted to be received intermediate said leg portions of said clamping element in opposed facing relation, said cable-gripping elements each being adapted to engage a respective one of said washers.